(12) United States Patent
James et al.

(10) Patent No.: US 8,913,080 B2
(45) Date of Patent: Dec. 16, 2014

(54) PARTITIONING HIGH RESOLUTION IMAGES INTO SUB-IMAGES FOR DISPLAY

(75) Inventors: Richard K. James, Redmond, WA (US); Benjamin C. Constable, Redmond, WA (US); Rafael V. Cintron, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 846 days.

(21) Appl. No.: 13/103,758

(22) Filed: May 9, 2011

(65) Prior Publication Data

US 2012/0287151 A1 Nov. 15, 2012

(51) Int. Cl.
*G09G 5/00* (2006.01)
*G06F 3/14* (2006.01)

(52) U.S. Cl.
CPC ........ *G09G 5/005* (2013.01); *G09G 2340/0414* (2013.01); *G06F 3/1415* (2013.01); *G09G 2370/08* (2013.01); *G09G 2340/0421* (2013.01); *G09G 5/001* (2013.01); *G09G 2340/0428* (2013.01)
USPC .......................................................... 345/628

(58) Field of Classification Search
CPC ................ G06T 2207/20021; G09G 2360/122
USPC ................................................ 345/628, 544
See application file for complete search history.

(56) References Cited

U.S. PATENT DOCUMENTS

| | | | |
|---|---|---|---|
| 6,247,084 B1 * | 6/2001 | Apostol et al. | 710/108 |
| 2002/0158872 A1 * | 10/2002 | Randel | 345/426 |
| 2003/0076534 A1 | 4/2003 | Li et al. | |
| 2008/0214146 A1 * | 9/2008 | Lincoln et al. | 455/412.1 |
| 2008/0259076 A1 * | 10/2008 | Meinds | 345/423 |
| 2008/0307113 A1 * | 12/2008 | Suga | 709/246 |
| 2009/0136142 A1 | 5/2009 | Kosaraju | |

OTHER PUBLICATIONS

Van Der Weide, M.C.A., "Exploring Tile-Based Rasterization Alternatives for Mobile Devices", Retrieved at <<http://repository.tudelft.nl/assets/uuid:d62f16d2-2139-4c94-bbb8-915f4c11537f/thesis-CE-MS-2010-19.pdf>>, Faculty of Electrical Engineering, Mathematics and Computer Science, Jul. 6, 2010, pp. 127.

Donner, et al., "Faster GPU Computations Using Adaptive Refinement", Retrieved at http://graphics.ucsd.edu/papers/adaptive/adaptive.pdf>>, In the Proceedings of ACM SIGGRAPH 2004, p. 1.

(Continued)

*Primary Examiner* — Maurice L McDowell, Jr.
*Assistant Examiner* — Kyle Zhai
(74) *Attorney, Agent, or Firm* — Bryan Webster; Kate Drakos; Micky Minhas (57) ABSTRACT

Various embodiments provide techniques for partitioning high resolution images into sub-images for display. In at least some embodiments, the techniques can enable a device to display an image in its native resolution (e.g., the image capture resolution) even when the image exceeds a threshold image size for the device. In example implementations, techniques determine that a size of an image exceeds a threshold image size for a system. Further to some embodiments, the techniques can determine that the image is to be partitioned into multiple sub-images that can each be processed and reassembled to display the image. The sub-images can each be rendered by a graphics processing functionality (e.g., a graphics processing unit) and displayed on a display device to present a version of the image in its native resolution.

20 Claims, 7 Drawing Sheets

(56) References Cited

OTHER PUBLICATIONS

Antochi, et al., "Selecting the Optimal Tile Size for Low-Power Tile-Based Rendering", Retrieved at <<http://citeseerx.ist.psu.edu/viewdoc/download?doi=10.1.1.3.520&rep=rep1&type=pdf>>, In the Proceedings of ProRISC, 2002, pp. 151-156.

Yu, et al., "Processing Satellite Images on Tertiary Storage: A Study of the Impact of Tile Size on Performance", Retrieved at http://citeseerx.ist.psu.edu/viewdoc/download?doi=10.1.1.153.2681&rep=rep1&type=pdf>>, In the Proceedings of NASA Conference on Mass Storage Systems, Sep. 1996, pp. 1-19.

Greener, Simon, "Tiling Very Large Rasters", Retrieved at <<http://www.spatialdbadvisor.com/blog/175/blog>>, Retrieved Date: Feb. 22, 2011, pp. 5.

"Image Tiling", Retrieved at <<http://idlastro.gsfc.nasa.gov/idl_html_help/Image_Tiling.html>>, Retrieved Date: Feb. 22, 2011, pp. 3.

Paul, Brian, "TR—OpenGL Tile Rendering Library", Retrieved at <<http://www.mesa3d.org/brianp/TR.html>>, Retrieved Date: Feb. 22, 2011, pp. 8.

\* cited by examiner

PARTITIONING HIGH RESOLUTION IMAGES INTO SUB-IMAGES FOR DISPLAY

BACKGROUND

Many devices are capable of creating and/or capturing high resolution images, e.g., images that are very large. Displaying high resolution images in their native resolution, however, can be problematic for some devices. For example, graphics rendering capabilities for some devices (e.g., data processing capabilities and/or memory resources) are such that a high resolution image may not display properly. Further, an attempt to display the high resolution image may cause undesirable device performance, such as a processing slow-down and/or a system lockup.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Various embodiments provide techniques for partitioning high resolution images into sub-images for display. In at least some embodiments, techniques determine that a size of an image exceeds a threshold image size. For example, the threshold image size can refer to a threshold image size for a device, for a system, for a process, and so on. Responsive to determining that the size of the image exceeds the threshold image size, the techniques can determine that the image is to be partitioned into multiple sub-images that can each be processed and reassembled to display the image. For example, the sub-images can each represent a portion of the image and can each be smaller than the threshold image size. The sub-images can each be rendered by a graphics processing functionality (e.g., a graphics processing unit) and displayed on a display device to present a version of the image in its native resolution.

BRIEF DESCRIPTION OF THE DRAWINGS

The same numbers are used throughout the drawings to reference like features.

DETAILED DESCRIPTION

Overview

Various embodiments provide techniques for partitioning high resolution images into sub-images for display. In at least some embodiments, the techniques can enable a device to display an image in its native resolution (e.g., the image capture resolution) even when the image exceeds a threshold image size, e.g., a threshold image size for the device. For example, the threshold image size can refer to a threshold image size for a device, for a system, for a process, and so on. In example implementations, techniques determine that a size of an image exceeds a threshold image size. For example, graphics functionalities of a particular computing device can be associated with a threshold (e.g., maximum) image size of 8,192 columns×4096 rows of pixels, and the image resolution can be higher than the threshold image size, e.g., 10,000×5,000 pixels of resolution.

Further to at least some embodiments, and responsive to determining that the size of the image exceeds the threshold image size, techniques can determine that the image is to be partitioned into multiple sub-images that can each be processed and reassembled to display the image. For example, the sub-images can each represent a portion of the image and can each be smaller than the threshold image size. The sub-images can each be rendered by a graphics processing functionality (e.g., a graphics processing unit) and displayed on a display device to present a version of the image in its native resolution.

In example implementations, a guide parameter is used to determine a size for the sub-images. The guide parameter can be calculated, in at least some embodiments, as a mathematical function of a graphics memory threshold for the system and an image memory attribute for the system. For example, the graphics functionalities of the system can have a graphics memory threshold that, if exceeded for a particular graphics operation (e.g., a drawing operation), may cause undesirable system performance and/or system lockup. Examples of the image memory attribute are discussed in more detail below. In at least some embodiments, using the guide parameter to determine the size for the sub-images can prevent the sub-images from exceeding the graphics memory threshold.

Further to one or more embodiments, an image is partitioned into multiple sub-images, with at least some of the sub-images being sized using the guide parameter as discussed above and below. The sub-images are processed (e.g., rendered) by the graphics functionalities of the system and then reassembled such that the image can be displayed via the system. Thus, in at least some embodiments, the techniques enable a high-resolution image that exceeds a threshold image size, e.g., for a particular system, to be processed and displayed (e.g., in its native capture resolution) via the system.

In the discussion that follows, a section entitled "Operating Environment" is provided and describes one environment in which one or more embodiments can be employed. Following this, a section entitled "Example Methods" describes example methods in accordance with one or more embodiments. Next, a section entitled "Example Image Processing Scenario" describes an example image processing scenario in accordance with one or more embodiment. Last, a section entitled "Example System" describes an example system that can be utilized to implement one or more embodiments.

Operating Environment

Figure 1:
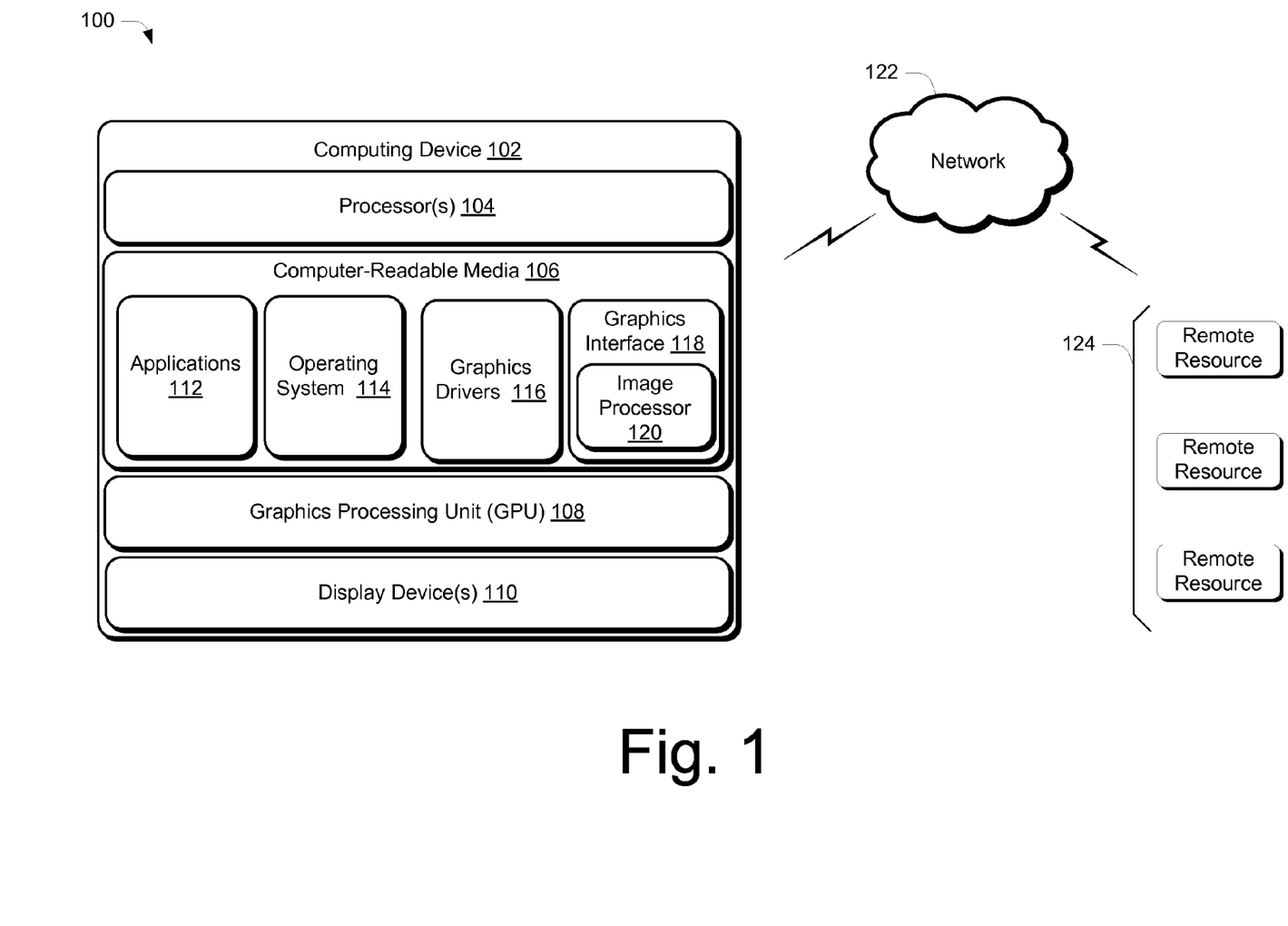
FIG. 1 illustrates an operating environment in which various principles described herein can be employed in accordance with one or more embodiments.

FIG. 1 illustrates an operating environment in accordance with one or more embodiments, generally at 100. Environment 100 includes a computing device 102 having one or more processors 104, one or more computer-readable storage media 106, a graphics processing unit (GPU) 108, and one or more display devices 110. Computing device 102 can be embodied as any suitable computing device such as, by way of example and not limitation, a desktop computer, a portable computer, a handheld computer such as a personal digital assistant (PDA), cell phone, and the like. One specific example of a computing device is shown and described below in FIG. 7.

Also included as part of the computing device 102 are one or more applications 112, an operating system 114, one or more graphics drivers 116, and a graphics interface 118 that reside on the computer-readable storage media 106 and which are executable by the processor(s) 104. In at least some embodiments, the graphics interface 118 is configured to provide graphics rendering functionality for the computing device 102. For example, the graphics interface 118 can be implemented as a component of the operating system 114 that directs graphics rendering operations that are performed through a central processing unit, such as the processors 104. The graphics interface 118 can act as an interface between various entities that request graphics operations (e.g., the application(s) 112) and graphics hardware of the computing device 102, such as via GPU 108 and/or the graphics drivers 116. In at least some embodiments, the graphics drivers 116 enable communication with the display device(s) 110 such that content (e.g., images and/or video) can be displayed on the display devices.

As part of implementing techniques discussed herein, the graphics interface 118 includes an image processor 120. In at least some embodiments, the image processor 120 is configured to determine whether an image exceeds a threshold image size for the computing device 102. Responsive to this determination, the image processor 120 can cause the image to be partitioned into multiple sub-images. The multiple sub-images can be rendered by the GPU 108 and displayed (e.g., as connected tiles) by the display device(s) 110 to cause the image to be displayed.

Further included as part of the environment 100 is a network 122, such as the Internet, and one or more remote resources 124 which are remote from the computing device 102 and from which content can be received and to which content can be sent, as described above and below. Such content can include web pages, files, images, and so on, that can be rendered and displayed on the display device(s) 110.

Having described an example operating environment, consider now a discussion of some example methods in accordance with one or more embodiments.

Example Methods

Discussed below are methods that can be used to implement techniques discussed herein. The methods can be implemented in connection with any suitable hardware, software, firmware, or combination thereof. In at least some embodiments, the methods can be implemented in software in the form of a graphics interface and/or an image processor, such as the ones described above.

Figure 2:
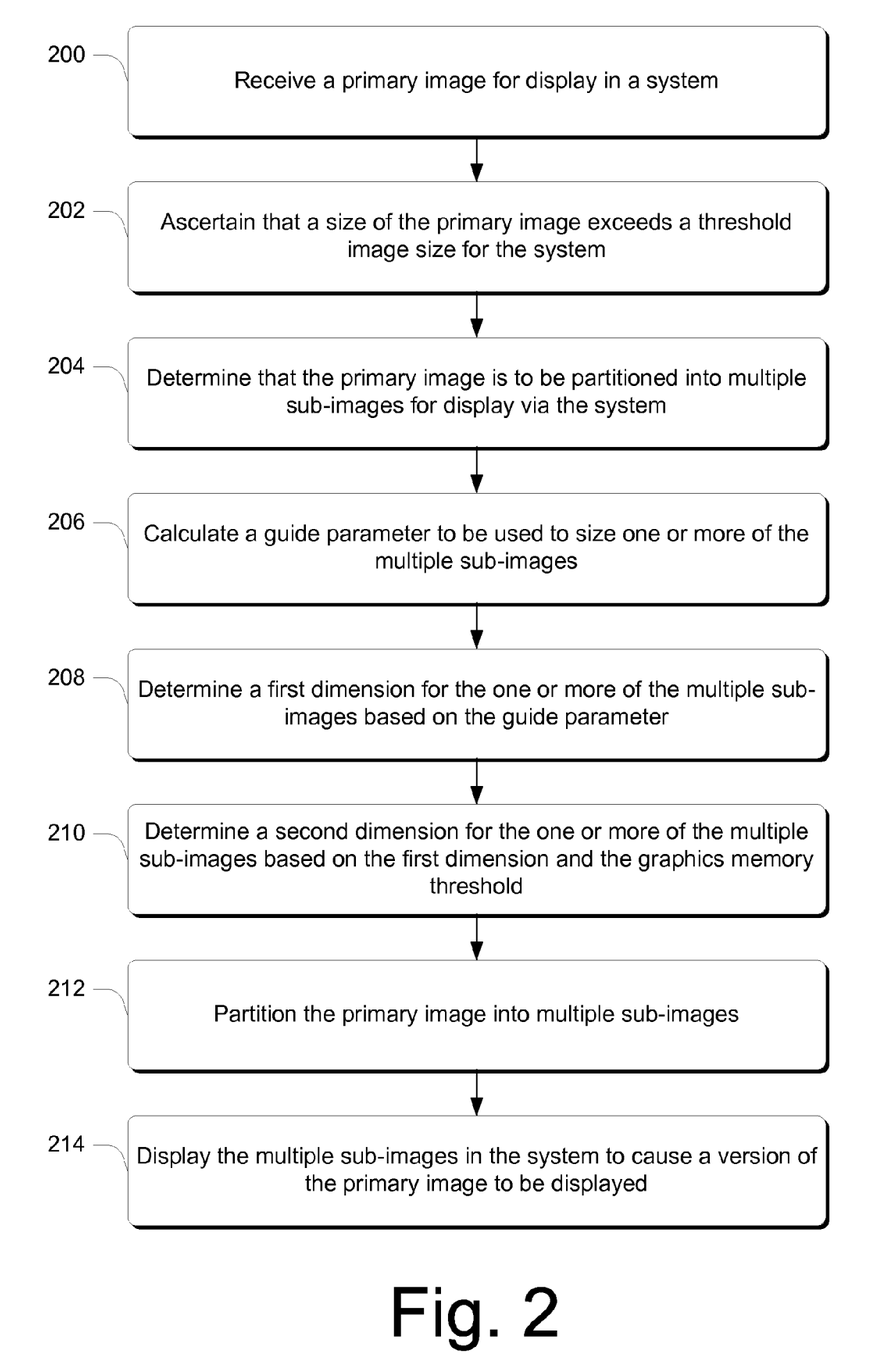
FIG. 2 is a flow diagram that describes steps in a method in accordance with one or more embodiments.

FIG. 2 is a flow diagram that describes steps in a method in accordance with one or more embodiments. Step 200 receives a primary image for display in a system. For example, with reference to operating environment 100 discussed above, the graphics interface 118 can receive an image (e.g., from the application(s) 112 and/or the remote resource(s) 124) for display on the display device(s) 110. Step 202 ascertains that a size of the primary image exceeds a threshold image size for the system. In at least some embodiments, a threshold image size can be determined based on constraints of a system, such as the processing capabilities of a graphics processing unit, memory resources (e.g., as part of a video card) available for graphics operations, device driver capabilities, and so on. Additionally or alternatively, the threshold image size can be user-specified.

For example, with reference to operating environment 100, in some implementations, the GPU 108 can be configured to process a maximum image size of 8,192 columns×4096 rows of pixels, and the size of the primary image can be higher than the maximum image size, e.g., 10,000×5,000 pixels of resolution. The image processor 120 can ascertain, based on the threshold image size and the size of the primary image, that the primary image exceeds the threshold image size.

Step 204 determines that the primary image is to be partitioned into multiple sub-images for display via the system. For example, the image processor 120 can determine that since the primary image exceeds the threshold image size, the primary image is to be partitioned into multiple smaller sub-images. Step 206 calculates a guide parameter to be used to size one or more of the multiple sub-images. In at least some embodiments, the guide parameter can be calculated using an image memory attribute of the system that is based on an amount of memory used to process, represent, and/or store an image in the system. For example, consider an implementation where images are stored and/or handled in a compressed form, e.g., using a data compression technique. In such embodiments, the image memory attribute can be calculated based on a memory size of a compressed image.

As an additional example, the image memory attribute can be a number of bytes-per-pixel used to render and/or display images in the system. In example implementations, the system can use four bytes-per-pixel to represent an image for display: one byte for red, one byte for green, one byte for blue, and one byte for alpha compositing. Thus, in such example embodiments, the image memory attribute is four bytes-per-pixel. For purposes of the discussion herein, the image memory attribute will be discussed with reference to the bytes-per-pixel used to display images in a system. This is not intended to be limiting, however, and a variety of different image memory attributes can be utilized to calculate the guide parameter without departing from the spirit and scope of the disclosed embodiments.

Further to such implementations, the guide parameter can be calculated using the bytes-per-pixel of the system and a graphics memory threshold of the system. For example, the system can have a graphics memory threshold that refers to an amount of graphics memory available to be used to perform graphics operations, such as a drawing operation. In at least some embodiments, the graphics memory threshold can be based on graphics memory constraints of the system and/or the graphics memory threshold can be user-specified. The graphics memory can be provided as part of a video card or other dedicated graphics device, and/or can be included as part (e.g., a partition) of a primary memory resource of a computing device. In example implementations, exceeding the graphics memory threshold for a graphics operation can cause degradation in system performance, such as processing slowdown and/or system lockup. Using the guide parameter to size sub-images can prevent sub-images from exceeding the graphics memory threshold. Example ways of calculating a guide parameter are discussed in more detail below.

Step 208 determines a first dimension for the one or more of the multiple sub-images based on the guide parameter. In at least some embodiments, a sub-image can be in the shape of a square, a rectangle, a quadrilateral, or other similar shape, that has sides and dimensions for each side. Further to such embodiments, the first dimension can be a measurement (e.g., in pixels) of a shorter side of a sub-image or sub-images. Example ways of using a guide dimension to determine a dimension of a sub-image are discussed in more detail below.

Step 210 determines a second dimension for the one or more of the multiple sub-images based on the first dimension and the graphics memory threshold. As discussed above, in some embodiments the system can be associated with a number of bytes-per-pixel used to represent pixels on a display device and a threshold amount of memory that can be used to perform graphics operations. Further to such embodiments, the second dimension can be determined by determining how large the second dimension can be without a sub-image with sides of the first dimension and the second dimension (e.g., a quadrilateral) exceeding the graphics memory threshold. Example ways of using a graphics memory threshold to determine a dimension of a sub-image are discussed below in more detail.

Step 212 partitions the primary image into multiple sub-images. For example, the multiple sub-images can be rendered as tiles that each includes a portion of the primary image. In at least some embodiments, some of the sub-images can be configured with the first dimension and the second dimension determined above, and others of the sub-images can be larger and/or smaller. For example, dimensions of the primary image can be such that the primary image cannot be represented by a discrete number of sub-images generated using the first dimension and the second dimension. Thus, sub-images can be generated with dimensions that are smaller than the first dimension and/or the second dimension. These generated sub-images can then represent portions of the primary image that cannot be represented by a discrete number of sub-images that are generated using the first dimension and the second dimension.

Step 214 displays the multiple sub-images in the system to cause a version of the primary image to be displayed. For example, as discussed above, the multiple sub-images can be rendered as tiles that each includes a portion of the primary image. Further, at least some of the tiles can be rendered using the first dimension and the second dimension. The tiles can be arranged on a display device (e.g., the display device 110 of operating environment 100) such that the tiles are connected to form a display version of the primary image. In at least some embodiments, the display version of the primary image can be displayed in a native resolution of the primary image, e.g., a resolution in which the primary image was captured and/or received.

Figure 3:
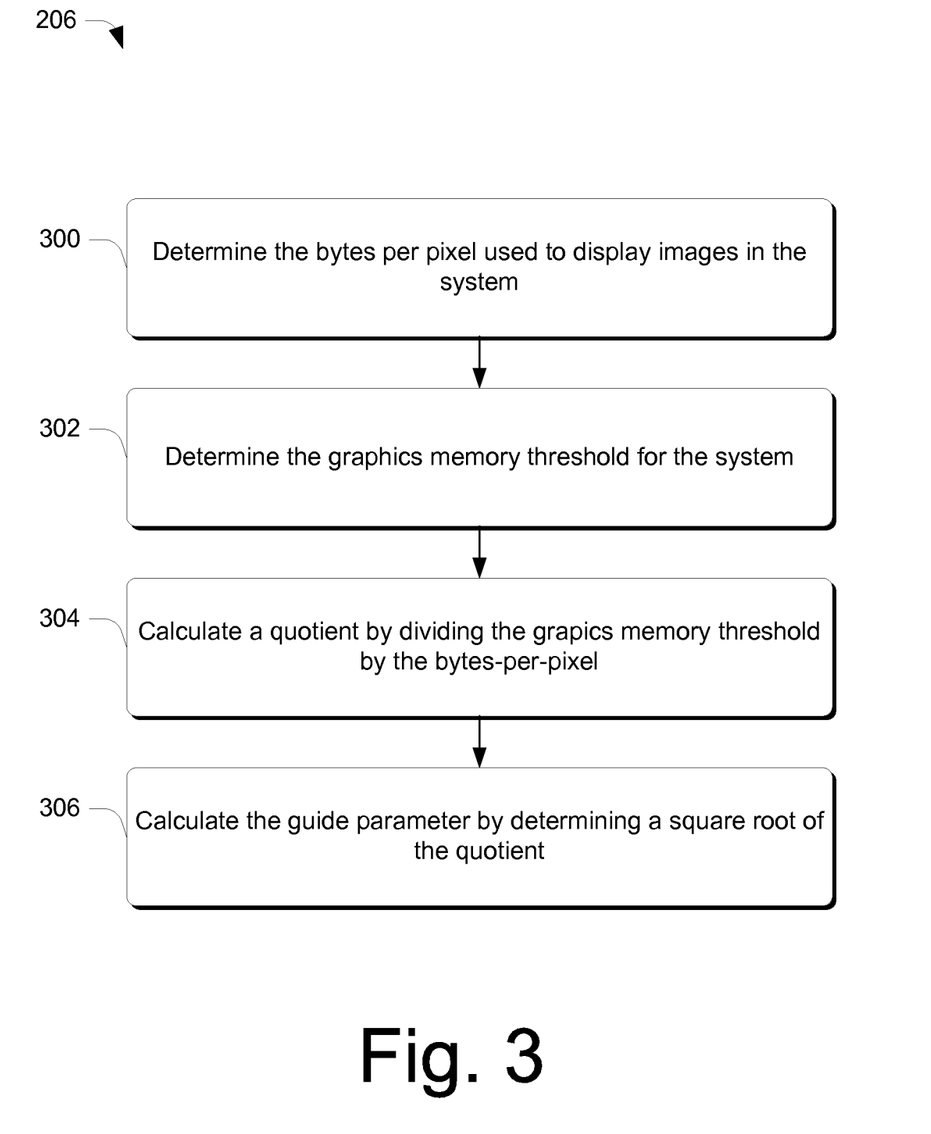
FIG. 3 is a flow diagram that describes steps in a method in accordance with one or more embodiments.

FIG. 3 is a flow diagram that describes steps in a method for implementing step 206 of FIG. 2 in accordance with one or more embodiments. Step 300 determines the bytes-per-pixel used to display images in the system. As discussed above, a system can be configured to use a particular number of bytes to represent different aspects of an individual pixel, such as color, shading, and so on. Step 302 determines the graphics memory threshold for the system. An example discussion of a graphics memory threshold is discussed above.

Step 304 calculates a quotient by dividing the graphics memory threshold by the bytes-per-pixel. For example, consider a scenario where a system uses four bytes-per-pixel and a graphics memory threshold for the system is four megabytes. Calculating the quotient can be represented using the following equation:

$$\frac{4{,}194{,}304 \text{ bytes}}{4 \text{ bytes per pixel}} = 1{,}048{,}576 \text{ pixels}$$

Step 306 calculates the guide parameter by determining the square root of the quotient. Continuing the example scenario discussed above, the guide parameter can be calculated using the following equation:

$$\sqrt{1{,}048{,}576 \text{ pixels}} = 1024 \text{ pixels}$$

Thus, in the example scenario, a guide parameter of 1024 pixels is calculated. This example calculation of a guide parameter is presented for purposes of example only, and a variety of different ways of calculating the guide parameter can be used within the spirit and scope of the claimed embodiments. For example, other mathematical functions of the graphics memory threshold and/or the bytes-per-pixel for a system can be utilized to determine the guide parameter. Examples of such other mathematical functions include, by way of example and not limitation, using different roots of the quotient discussed above (e.g., cube root, fourth root, and so on), using multiples of a root, using a ratio (e.g., a golden mean ratio) of the graphics memory threshold and/or the bytes-per-pixel, and so on.

Figure 4:
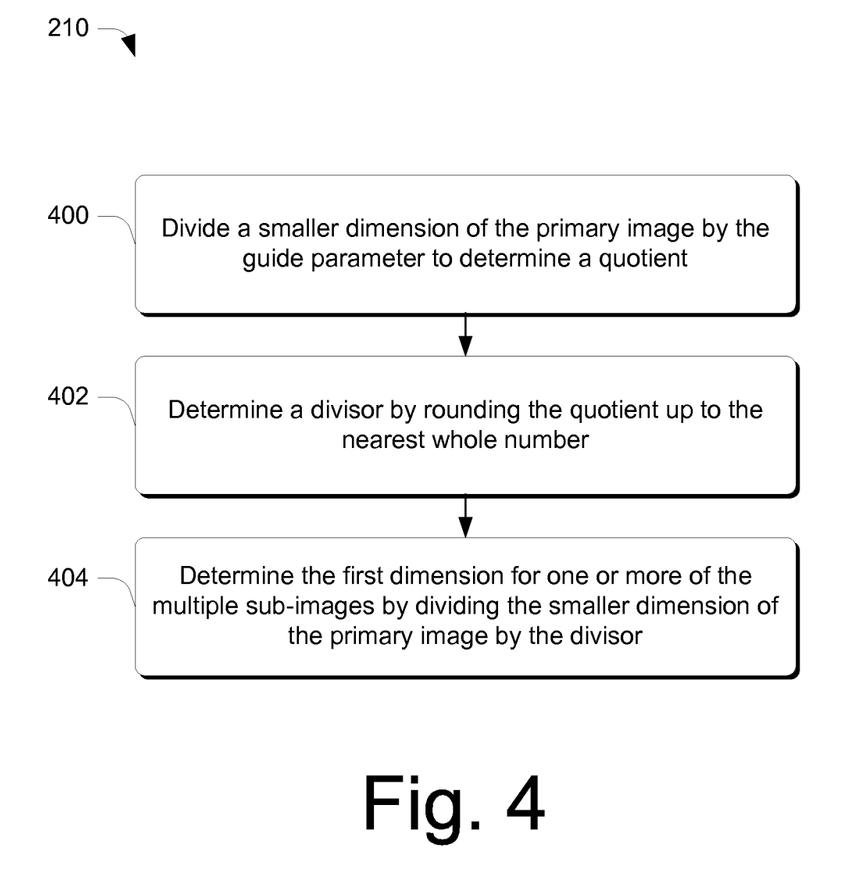
FIG. 4 is a flow diagram that describes steps in a method in accordance with one or more embodiments.

FIG. 4 is a flow diagram that describes steps in a method for implementing step 208 of FIG. 2 in accordance with one or more embodiments. Step 400 divides a smaller dimension of the primary image by the guide parameter to determine a quotient. In at least some embodiments, an image can include multiple sides and a dimension (e.g., a measurement) for each of the multiple sides. Further to some embodiments, a smaller dimension of an image can be a side of the image with the smallest dimension. For example, continuing the scenario discussed above with reference to FIG. 3, consider that the primary image has a resolution of 10,000 pixels by 5,000 pixels. Thus, the smaller dimension of the primary image is 5,000 pixels and the larger dimension is 10,000 pixels. The quotient can be determined using the following equation:

$$\frac{5{,}000 \text{ pixels}}{1{,}024} = 4.88 \text{ pixels}$$

Step 402 determines a divisor by rounding the quotient up to the nearest whole number. For example, continuing with the ongoing scenario, the quotient 4.88 can be rounded up to determine a divisor of 5. Step 404 determines the first dimension for one or more of the multiple sub-images by dividing the smaller dimension of the primary image by the divisor. Further to the example scenario, the first dimension can be calculated using the following equation:

$$\frac{5{,}000 \text{ pixels}}{5} = 1{,}000 \text{ pixels}$$

Thus, in the example scenario, a first dimension for the sub-image of 1,000 pixels is calculated.

Figure 5:
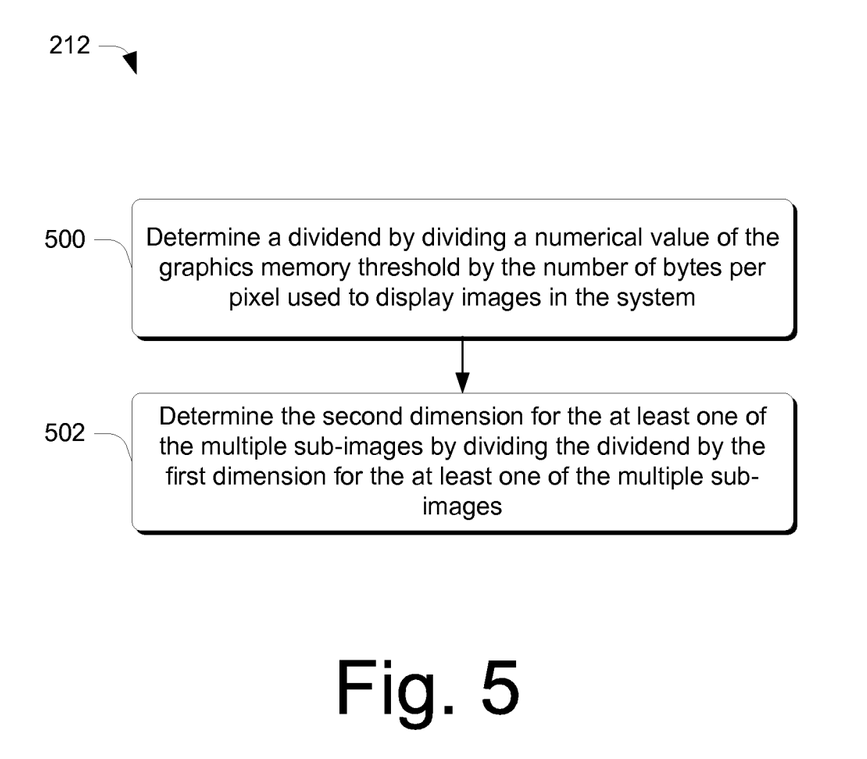
FIG. 5 is a flow diagram that describes steps in a method in accordance with one or more embodiments.

FIG. 5 is a flow diagram that describes steps in a method for implementing step 210 of FIG. 2 in accordance with one or more embodiments. Step 500 determines a dividend by dividing a numerical value of the graphics memory threshold by the number of bytes-per-pixel used to display images in the system. Example discussions of a graphics memory threshold and bytes-per-pixel are presented above. Continuing with the example scenario discussed above with reference to FIGS. 3 and 4, the dividend can be calculated using the following equation:

$$\frac{4{,}194{,}304 \text{ bytes}}{4 \text{ bytes per pixel}} = 1{,}048{,}576 \text{ pixels}$$

Thus, a dividend of 1,048,576 pixels is calculated. Step 502 determines the second dimension for one or more of the multiple sub-images by dividing the dividend by the first dimension. Continuing with the ongoing example scenario, the second dimension can be calculated using the following equation:

$$\frac{1{,}048{,}576 \text{ pixels}}{1{,}000} = 1{,}048 \text{ pixels}$$

Thus, a second dimension for one or more of the multiple sub-images of 1,048 pixels is calculated. According to the example scenario and using the first dimension and second dimension calculated above, a sub-image size of 1,000×1,048 pixels is calculated. As discussed above, in some embodiments multiple different sizes of sub-images can be used to represent an image, and thus the first dimension and second dimension referenced in the discussion herein can be used for one sub-image, for several sub-images, and/or for all sub-images.

Having described some example methods, consider now a discussion of an example image processing scenario in accordance with one or more embodiments.

Example Image Processing Scenario

Figure 6:
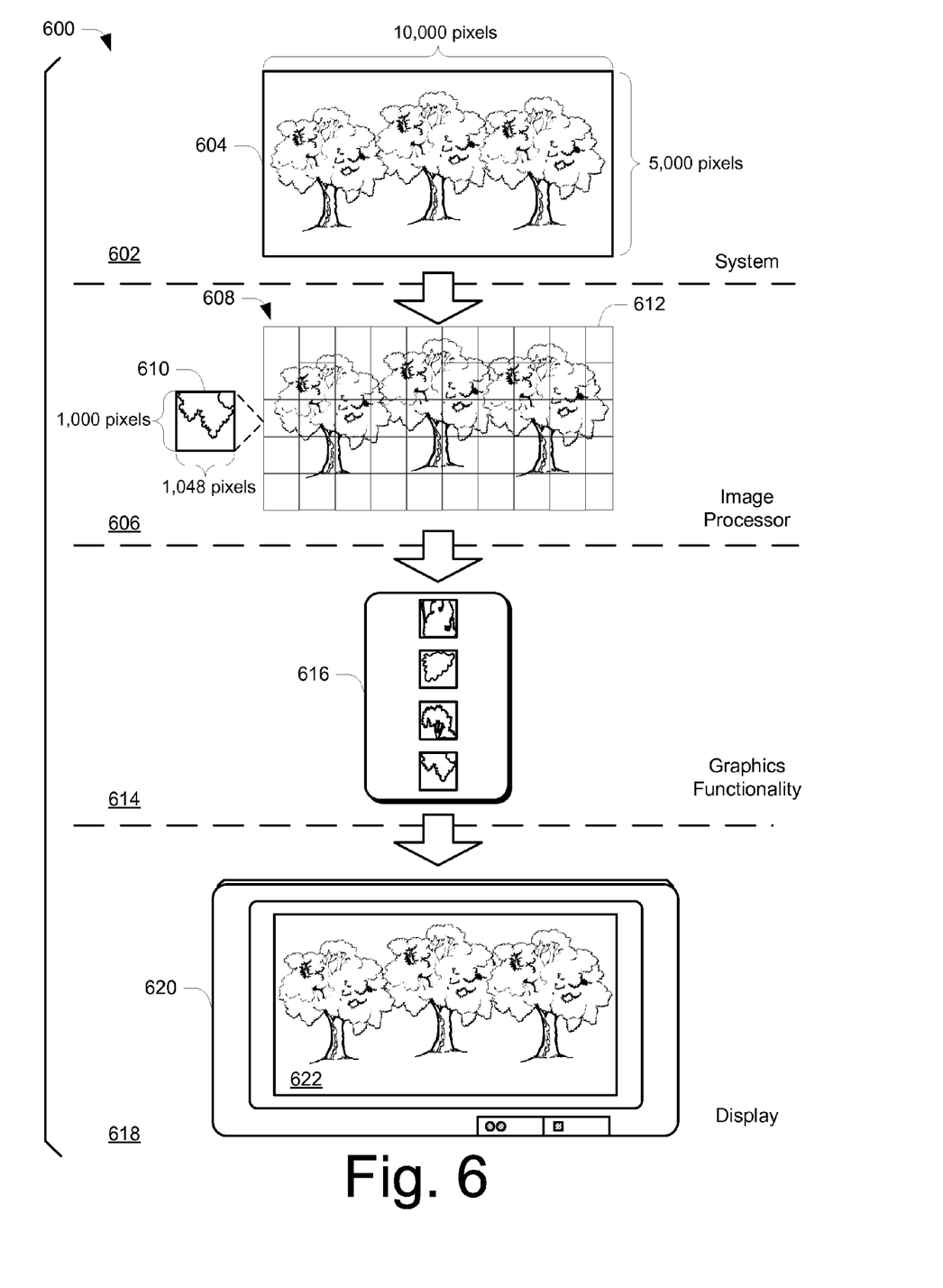
FIG. 6 illustrates an example image processing scenario in accordance with one or more embodiments.

FIG. 6 illustrates an example image processing scenario in accordance with one or more embodiments, generally at 600. In at least some embodiments, techniques discussed herein can be implemented to perform operations associated with the example image processing scenario. Further, operations associated with the image processing scenario 600 can be implemented via software in the form of a graphics interface and/or an image processor, such as the ones described above. To aid in understanding of concepts discussed herein, aspects of the image processing scenario 600 will be discussed with reference to the example implementation scenario discussed above with reference to FIGS. 3-5.

As part of the image processing scenario 600, at 602 an image 604 is received in a system. In at least some embodiments, the image 602 corresponds to the primary image discussed above and can be received for display in a system. For example, the image 602 can be received by the computing device 102 from the application(s) 112 and/or the remote resource(s) 124, discussed above with reference to operating environment 100.

At 606, an image processor (e.g., the image processor 120) determines that the image 604 exceeds a threshold image size for the system, and the image 604 is partitioned into sub-images 608. In at least some embodiments, each of the sub-images 608 includes a particular portion of the image 604. Consider, for example, that the image 604 has an image size of 10,000×5,000 pixels. Using techniques discussed herein, multiple of the sub-images 608 are configured to have a size of 1,048×1,000 pixels. For instance, a sub-image 610 includes a portion of the image 604 and has the dimensions of 1,048×1,000 pixels.

Also included as part of the sub-images 608 is a column 612 that includes sub-images that have a different size than others of the sub-images 608, e.g., than the sub-image 610. In at least some embodiments, a particular image may not be evenly divisible into a discrete number of sub-images of a uniform size. For example, in the image processing scenario 600, the image 604 has a size of 10,000×5,000 pixels, and thus is not evenly divisible using the sub-image size of 1,048× 1,000 pixels. Thus, the column 612 of the sub-images is used for the remaining portions of the image 604. According to the current example scenario, each of the sub-images included as part of the column 612 have an approximate size of 568×1,000 pixels. Combined with the others of the sub-images 608, the sub-images from the column 612 enable the entire image 604 to be represented by sub-images.

Further to the image processing scenario 600, at 614 the sub-images 608 are rendered by graphics functionality 616. For example, the sub-images 608 can be submitted by the image processor individually and/or in sub-groups to a graphics rendering functionality, such as the GPU 108 of operating environment 100. At 618, the rendered sub-images are assembled on a display device 620 and displayed as an image 622. In at least some embodiments, the image 622 is a displayed version of the image 604 that is displayed in a resolution in which the image 604 was captured and/or received.

Having described some example drawing areas, consider now a discussion of an example system in accordance with one or more embodiments.

Example System

Figure 7:
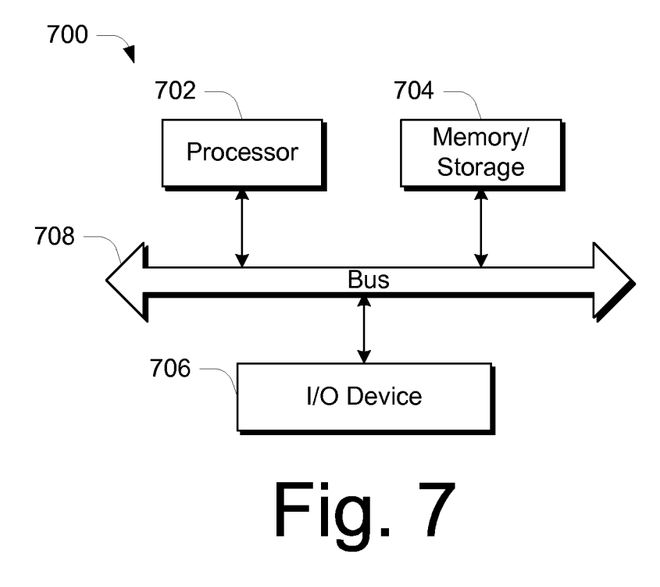
FIG. 7 illustrates an example system that can be used to implement one or more embodiments.

FIG. 7 illustrates an example computing device 700 that can be used to implement the various embodiments described above. Computing device 700 can be, for example, computing device 102 or remote resources 124 of FIG. 1.

Computing device 700 includes one or more processors or processing units 702, one or more memory and/or storage components 704, one or more input/output (I/O) devices 706, and a bus 708 that allows the various components and devices to communicate with one another. Bus 708 represents one or more of any of several types of bus structures, including a memory bus or memory controller, a peripheral bus, an accelerated graphics port, and a processor or local bus using any of a variety of bus architectures. Bus 708 can include wired and/or wireless buses.

Memory/storage component 704 represents one or more computer storage media. Component 704 can include volatile media (such as random access memory (RAM)) and/or nonvolatile media (such as read only memory (ROM), Flash memory, optical disks, magnetic disks, and so forth). Component 704 can include fixed media (e.g., RAM, ROM, a fixed hard drive, etc.) as well as removable media (e.g., a Flash memory drive, a removable hard drive, an optical disk, and so forth).

One or more input/output devices 706 allow a user to enter commands and information to computing device 700, and also allow information to be presented to the user and/or other components or devices. Examples of input devices include a keyboard, a cursor control device (e.g., a mouse), a microphone, a scanner, and so forth. Examples of output devices include a display device (e.g., a monitor or projector), speakers, a printer, a network card, and so forth.

Various techniques may be described herein in the general context of software or program modules. Generally, software includes routines, programs, objects, components, data structures, and so forth that perform particular tasks or implement particular abstract data types. An implementation of these modules and techniques may be stored on or transmitted across some form of computer readable media. Computer readable media can be any available medium or media that can be accessed by a computing device. By way of example, and not limitation, computer readable media may comprise "computer-readable storage media".

"Computer-readable storage media" include volatile and non-volatile, removable and non-removable media implemented in any method or technology for storage of information such as computer readable instructions, data structures, program modules, or other data. Computer-readable storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer. While the computing device 700 is configured to receive and/or transmit instructions via a signal bearing medium (e.g., as a carrier wave) to implement techniques discussed herein, computer-readable storage media of the computing device are configured to store information and thus do not include a signal bearing medium.

CONCLUSION

Various embodiments provide techniques for partitioning high resolution images into sub-images for display. In at least some embodiments, the techniques can enable a device to display an image in its native resolution (e.g., the image capture resolution) even when the image exceeds a threshold image size for the device.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented method comprising:
    determining, responsive to ascertaining that a size of a primary image exceeds a threshold image size for a system, that the primary image is to be partitioned into multiple sub-images;
    calculating a guide parameter to be used to size at least one of the multiple sub-images, the guide parameter being calculated as a mathematical function of both an image memory attribute of the system and a graphics memory threshold for the system;
    determining a first dimension for the at least one of the multiple sub-images based on the guide parameter;
    determining a second dimension for the at least one of the multiple sub-images based on an amount of graphics memory up to the graphics memory threshold available to generate the at least one of the multiple sub-images using the first dimension; and
    partitioning the primary image into the multiple sub-images.

2. The computer-implemented method of claim 1, wherein the threshold image size is based on one or more of graphics processing capabilities or graphics memory capabilities of the system.

3. The computer-implemented method of claim 1, wherein the image memory attribute comprises a number of bytes-per-pixel used to display images in the system.

4. The computer-implemented method of claim 3, wherein calculating the guide parameter comprises:
    calculating a quotient by dividing the graphics memory threshold by the bytes-per-pixel for the system; and
    calculating the guide parameter by determining a root of the quotient.

5. The computer-implemented method of claim 1, wherein the graphics memory threshold comprises an amount of graphics memory available to be used to perform graphics operations for the system.

6. The computer-implemented method of claim 1, wherein determining the first dimension comprises:
    dividing a smaller dimension of the primary image by the guide parameter to determine a quotient;
    determining a divisor by rounding the quotient up to the nearest whole number; and
    determining the first dimension by dividing the smaller dimension of the primary image by the divisor.

7. The computer-implemented method of claim 1, wherein the image memory attribute comprises a number of bytes-per-pixel used to display images in the system, and wherein determining the second dimension comprises:
    determining a dividend by dividing a numerical value of the graphics memory threshold by the number of bytes-per-pixel; and
    determining the second dimension by dividing the dividend by the first dimension.

8. The computer-implemented method of claim 1, wherein the multiple sub-images include the at least one of the multiple sub-images with the first dimension and the second dimension, the method further comprising displaying the multiple sub-images in the system to cause a version of the primary image to be displayed.

9. The computer-implemented method of claim 8, wherein the version of the primary image is in a native resolution of the primary image.

10. A computer-implemented method comprising:
    determining, responsive to ascertaining that a size of a primary image exceeds a threshold image size for a system, that the primary image is to be partitioned into multiple sub-images;
    determining a first dimension for at least one of the multiple sub-images based on a guide parameter, the guide parameter calculated as a mathematical function of both a number of bytes-per-pixel for the system and a graphics memory threshold for the system;
    determining a second dimension for the at least one of the multiple sub-images based on an amount of graphics memory up to the graphics memory threshold available to generate the at least one of the multiple sub-images using the first dimension; and
    partitioning the primary image into the multiple sub-images including the at least one of the multiple sub-images.

11. The computer-implemented method of claim 10, wherein a size of the at least one of the multiple sub-images is below the threshold image size for the system.

12. The computer-implemented method of claim 10, wherein the guide parameter is calculated by:
    calculating a quotient by dividing the graphics memory threshold by the bytes-per-pixel for the system; and
    determining a root of the quotient.

13. The computer-implemented method of claim 12, wherein determining the first dimension for the at least one of the multiple sub-images further comprises:
    dividing a smaller dimension of the primary image by the guide parameter to determine a different quotient, the primary image comprising multiple sides and the smaller dimension comprising a smallest side of the multiple sides;
    determining a divisor by rounding the different quotient up to the nearest whole number; and
    determining the first dimension by dividing the smaller dimension of the primary image by the divisor.

14. The computer-implemented method of claim 10, wherein determining the second dimension comprises:
    determining a dividend by dividing a numerical value of the graphics memory threshold by the number of bytes-per-pixel; and
    determining the second dimension by dividing the dividend by the first dimension.

15. The computer-implemented method of claim 10, wherein each of the multiple sub-images including a portion of the primary image, the method further comprising displaying the multiple sub-images in the system effective to cause a version of the primary image to be displayed.

16. The computer-implemented method of claim 15, wherein displaying the multiple sub-images in the system comprises rendering the multiple sub-images as tiles and displaying the tiles adjacent to one another effective to cause the version of the primary image to be displayed.

17. A system comprising:
one or more processors; and
one or more computer readable storage media comprising computer-executable instructions that are executable by the one or more processors to perform operations including:
determining that an image that exceeds a threshold image size for a system is to be partitioned into multiple sub-images;
determining a first dimension for at least one of the multiple sub-images based on a number of bytes-per-pixel for the system and a graphics memory threshold for the system;
determining a second dimension for the at least one of the multiple sub-images based on an amount of graphics memory up to the graphics memory threshold available to generate the at least one of the multiple sub-images using the first dimension, including determining how large the second dimension can be before the at least one of the multiple sub-images exceeds the graphics memory threshold for the system; and
partitioning the image into the multiple sub-images including the at least one of the multiple sub-images being sized using the first dimension and the second dimension.

18. The system of claim 17, wherein the operations further include determining the first dimension for at least one of the multiple sub-images by:
determining a guide parameter by dividing the graphics memory threshold by the bytes-per-pixel to calculate a quotient, and determining a root of the quotient;
dividing a smaller dimension of the image by the guide parameter to determine a different quotient;
determining a divisor by rounding the different quotient up to the nearest whole number; and
determining the first dimension by dividing the smaller dimension of the image by the divisor.

19. The system of claim 17, wherein the multiple sub-images include one or more sub-images that are smaller than the at least one of the multiple sub-images.

20. The system of claim 17, wherein determining the second dimension comprises:
determining a dividend by dividing a numerical value of the graphics memory threshold by the number of bytes-per-pixel; and
determining the second dimension by dividing the dividend by the first dimension.

* * * * *